US010562250B2

(12) United States Patent
Covey

(10) Patent No.: US 10,562,250 B2
(45) Date of Patent: Feb. 18, 2020

(54) NON-PNEUMATIC TIRE TREAD LAYER MOLD AND MOLDING PROCESS

(71) Applicant: American Kenda Rubber Industrial Co., Ltd., Reynoldsburg, OH (US)

(72) Inventor: Clinton Covey, Stow, OH (US)

(73) Assignee: AMERICAN KENDA RUBBER INDUSTRIAL CO., LTD., Reynoldsburg, OH (US)

( * ) Notice: Subject to any disclaimer, the term of this patent is extended or adjusted under 35 U.S.C. 154(b) by 152 days.

(21) Appl. No.: 15/651,675

(22) Filed: Jul. 17, 2017

(65) Prior Publication Data

US 2019/0016075 A1    Jan. 17, 2019

(51) Int. Cl.
| | |
|---|---|
| *B29D 30/02* | (2006.01) |
| *B29C 43/36* | (2006.01) |
| *B29C 43/02* | (2006.01) |
| *B29C 43/12* | (2006.01) |
| *B29C 43/10* | (2006.01) |
| B29L 30/00 | (2006.01) |
| B29C 33/48 | (2006.01) |

(52) U.S. Cl.
CPC ............ *B29D 30/02* (2013.01); *B29C 43/021* (2013.01); *B29C 43/102* (2013.01); *B29C 43/12* (2013.01); *B29C 43/3642* (2013.01); *B29C 33/485* (2013.01); *B29C 43/36* (2013.01); *B29C 2043/3649* (2013.01); *B29L 2030/002* (2013.01)

(58) Field of Classification Search
CPC ....... B29D 30/02; B29C 33/485; B29C 35/02; B29C 43/021; B29C 43/36
See application file for complete search history.

(56) References Cited

U.S. PATENT DOCUMENTS

| | | | | | |
|---|---|---|---|---|---|
| 1,779,396 | A | * | 10/1930 | Keller | B29D 30/0629 425/35 |
| 3,358,330 | A | * | 12/1967 | Pacciarini | B29D 30/06 249/180 |
| 4,116,596 | A | * | 9/1978 | Pizzorno | B29D 30/0661 425/35 |

(Continued)

OTHER PUBLICATIONS

Polaris Engineered Accessories, 6.2.5 Terrain Armor Tires, brochure, Mar. 29, 2017, 2 pages.

(Continued)

*Primary Examiner* — James P Mackey
(74) *Attorney, Agent, or Firm* — Standley Law Group LLP; Eric M. Gayan

(57) ABSTRACT

A NPT tread layer mold and molding process. The mold may include an inner mold portion that supports a built-up green NPT tread layer, and an outer mold portion that cooperates with the inner mold portion to cure the tread layer and to form a tread pattern in an outer surface thereof. The inner mold portion may comprise two halves, each having a plurality of wall segments that collectively cooperate to form a tread layer inner surface molding wall when the inner mold is closed. Sidewall molding portions may also be provided to form limited sidewalls of the NPT tread layer—with or without a tread pattern. An inflatable bladder may be located within the inner mold portion to apply pressure to the tread layer inner surface molding wall and, resultantly, to the NPT tread layer, during molding.

20 Claims, 12 Drawing Sheets

(56) References Cited

U.S. PATENT DOCUMENTS

| | | | | |
|---|---|---|---|---|
| 4,207,052 | A * | 6/1980 | Satzler | B29D 23/00 |
| | | | | 249/142 |
| 4,230,511 | A * | 10/1980 | Olsen | B29D 30/242 |
| | | | | 156/112 |
| 4,263,083 | A * | 4/1981 | Schleiger | B29D 30/0606 |
| | | | | 156/126 |
| 4,597,728 | A * | 7/1986 | McGlashen | B29C 33/485 |
| | | | | 249/180 |
| 6,086,811 | A * | 7/2000 | Fike | B29D 29/00 |
| | | | | 156/117 |
| 6,716,012 | B2 * | 4/2004 | Yovichin | B29D 29/085 |
| | | | | 249/184 |
| 7,001,163 | B2 * | 2/2006 | McBride | B29D 30/0601 |
| | | | | 425/28.1 |
| 7,189,069 | B2 * | 3/2007 | Yovichin | B29C 33/005 |
| | | | | 425/35 |
| 7,513,762 | B2 * | 4/2009 | McBride | B29D 30/56 |
| | | | | 425/43 |
| 8,104,524 | B2 | 1/2012 | Manesh et al. | |
| 8,109,308 | B2 | 2/2012 | Manesh et al. | |

OTHER PUBLICATIONS

Polaris Engineered Accessories, 61.6 Terrain Armor Tires—Ranger/Brutus Tires, brochure, Mar. 29, 2017, 1 page.

\* cited by examiner

SECTION 4-4

SECTION 4-4 + SECTION 6-6

NON-PNEUMATIC TIRE TREAD LAYER MOLD AND MOLDING PROCESS

TECHNICAL FIELD

Exemplary embodiments described herein are directed to a mold for manufacturing a finished tread layer for a non-pneumatic tire, and to a molding process using such a mold.

BACKGROUND

A non-pneumatic tire (NPT) may be generally described as including a tread layer that contacts the ground during use, and a subjacent supporting layer that does not rely on inflation pressure for rigidity. For example, the subjacent supporting layer may be formed as an interconnected web of collapsible open cells that are trapped between an inner ring and an outer ring. In such an embodiment, the tread layer is bonded or otherwise joined to the outer ring of the web layer. The inner ring of the web layer is then used to affix the NPT to a wheel, which is subsequently utilized to mount the NPT/wheel assembly to a vehicle.

In a typical pneumatic tire manufacturing process, the various materials from which the tire will be constructed are initially built up in layers around a mandrel to produce an uncured ("green") tire, and the green tire is subsequently placed in a mold to form the tread pattern, lettering and/or other features, and for vulcanization (curing). In contrast, the tread layer and the web layer of a NPT are formed separately, and subsequently joined to form a complete NPT. Consequently, in order to produce a high quality NPT, both the tread layer and the web layer must be separately manufactured with precise tolerances, and at least the inner surface of the tread layer and the exterior surface of the web layer outer ring needs to remain highly flat in order to result in proper bonding of the tread layer to the web layer.

The inventor is presently unaware of an efficient device and/or process for precisely and repeatably molding a NPT tread layer and, therefore, there is an unmet need for the same. Exemplary mold and molding process embodiments described herein satisfy this need.

SUMMARY

Exemplary molds and molding processes described herein facilitate the repeatable manufacturing of a dimensionally accurate NPT tread layer with a highly flat inner surface. Exemplary molds and molding processes described herein further facilitate loading of a green NPT tread layer, uniform curing of the green tread layer, and removal of a cured and fully molded NPT tread layer.

One exemplary embodiment of a NPT tread layer mold includes an inner mold portion for receiving and retaining a built-up green NPT tread layer, and an outer mold portion that cooperates with the inner mold portion to cure the tread layer while simultaneously forming a tread pattern in an outer surface of the tread layer.

The inner portion of an exemplary NPT tread layer mold may comprise two cooperating halves that, when the mold is placed in a molding machine, may be selectively engaged (closed) to form a complete inner mold, or separated so as to facilitate loading of a green NPT tread layer or demolding of a fully molded NPT tread layer. Each half of the inner mold portion may include, among other components, a sidewall plate, a base plate, a concentrically located bladder ring, and a pair (or more) of wall segments that are attached at one end to the base plate and extend substantially transversely therefrom. The wall segments may be hingedly connected to the base plate to allow for a limited inward pivoting of the wall segments when the inner mold halves are not fully engaged.

An previously mentioned, an exemplary NPT tread layer mold also includes an outer mold portion that is designed to form a desired tread pattern in the outer surface of the NPT tread layer. Consequently, the outer mold portion includes a tread pattern molding section that will surround a green NPT tread layer when the outer mold portion is properly mated to the inner mold portion. The outer mold portion may have other features that engage with corresponding features of the inner mold portion to ensure proper mold alignment, etc.

When an exemplary NPT tread layer mold is fully assembled, the outer mold portion is located to form a tread pattern on the outer surface of the green NPT tread layer, and the wall segments of the inner mold portion cooperate to form a solid inner mold wall that abuts the inside surface of the green NPT tread layer. The interior of the inner mold portion is a substantially hollow space within which may be located an inflatable bladder. During the NPT tread layer molding and curing process, the bladder may be inflated to apply pressure against the engaged inner mold portion wall segments which, in turn, apply pressure against the inner surface of the green NPT tread layer. This helps to ensure that the green NPT tread layer is forced against the tread pattern molding section of the outer mold and that the inner diameter of the cured NPT tread layer will be dimensionally accurate. Molding of the tread pattern and curing of the green NPT tread layer may further occur under heated conditions, as would be well understood by one of skill in the art.

Once the molding process is complete, the outer mold portion may be withdrawn from the assembled inner mold portion. The inner mold portion halves may thereafter be separated, and the fully-molded NPT tread layer may be removed.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
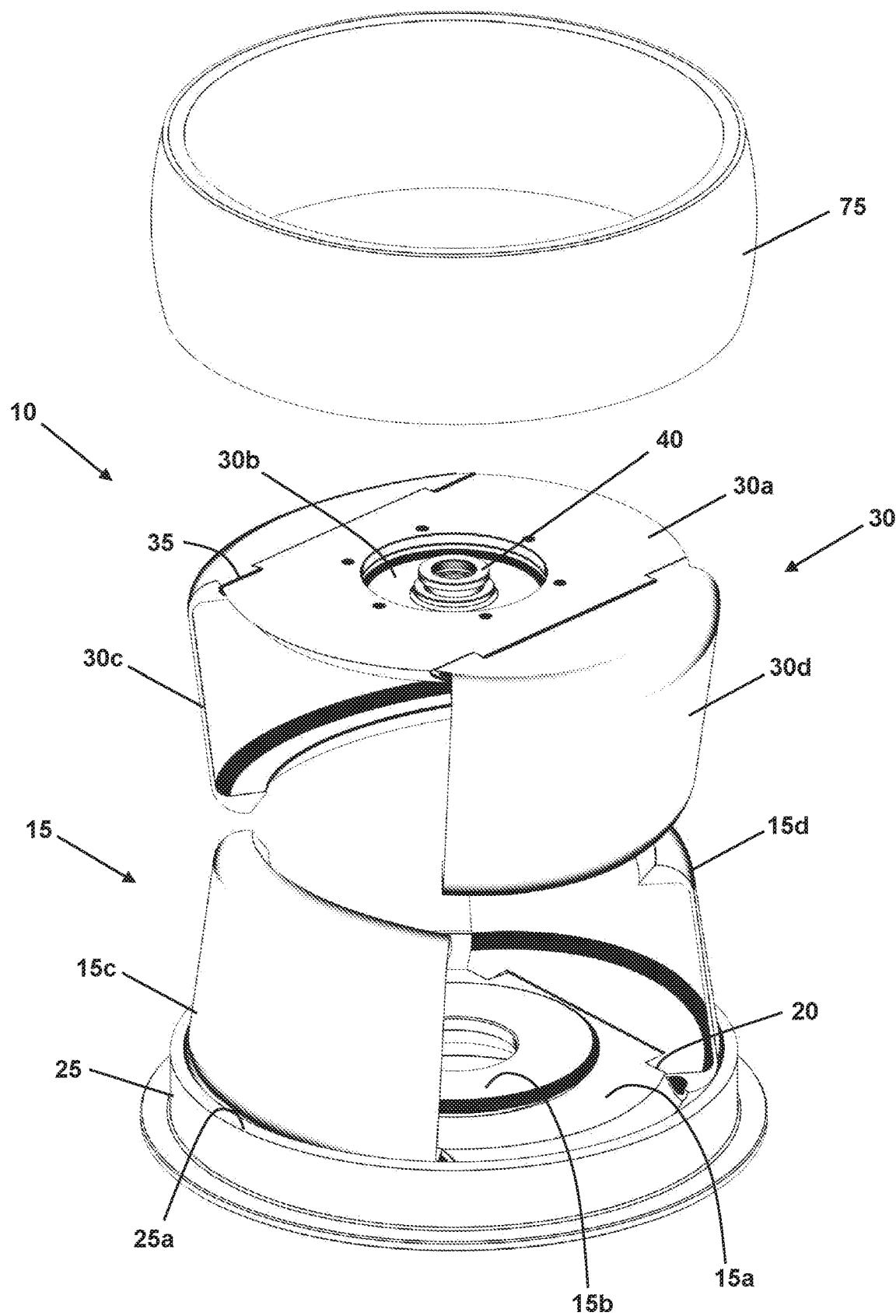
FIG. 1 depicts the cooperating mold halves of an exemplary inner mold portion of an exemplary NPT tread layer mold, along with a first sidewall plate, prior to loading of a green NPT tread layer.
Figure 2:
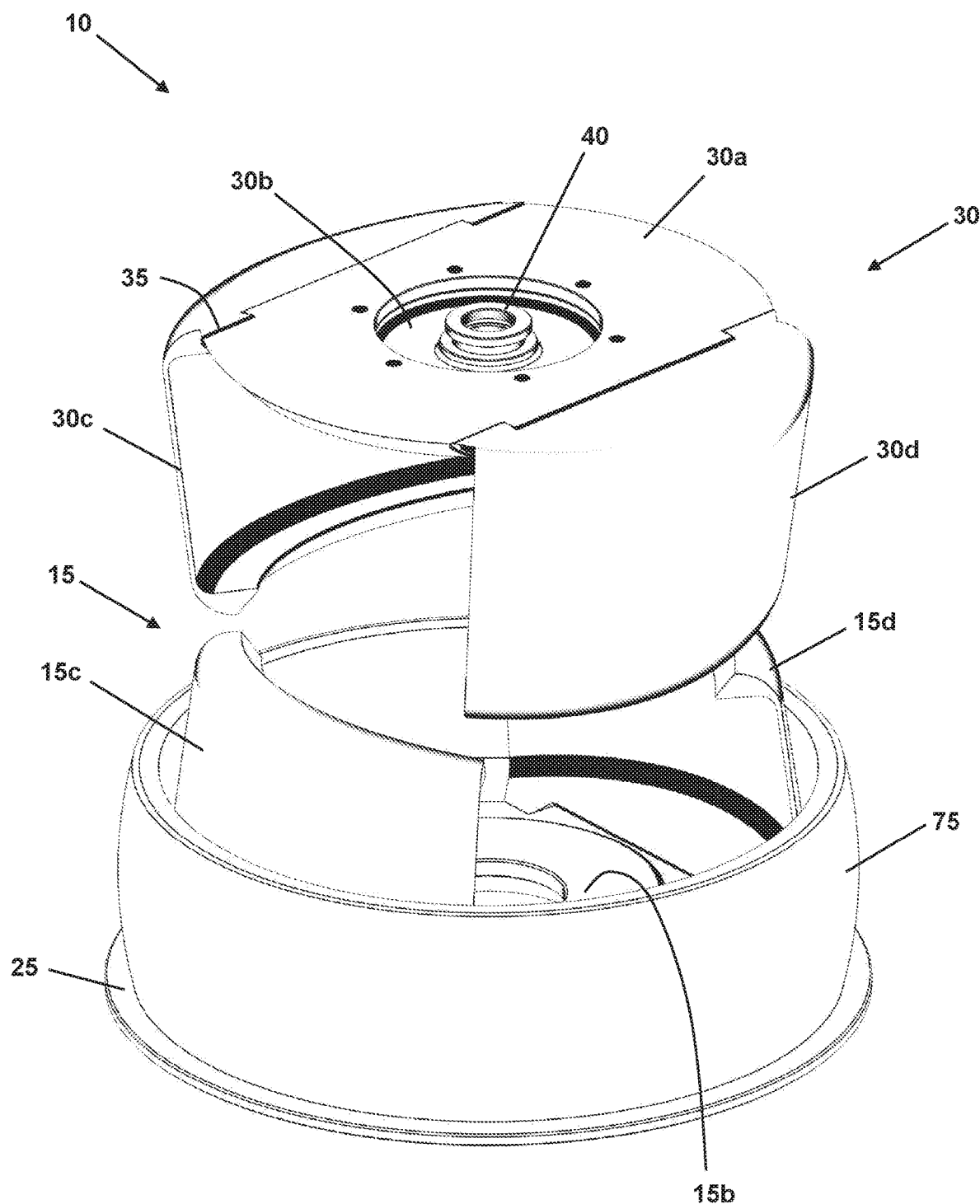
FIG. 2 shows a green NPT tread layer in place on the lower half of the inner mold portion of FIG. 1, prior to engagement of the mold halves.

One exemplary embodiment of a NPT tread layer mold 5 (see FIG. 6) and associated NPT tread layer molding process is illustrated by FIGS. 1-9. As illustrated, the exemplary NPT tread layer mold 5 includes an inner mold portion 10 having a first mold half 15 and a second mold half 30. The first mold half 15 and the second mold half 30 have a similar construction and a cooperating shape so as to facilitate formation of the inner mold portion 10 when the mold halves are engaged (as described in more detail below). The inner mold portion 10 is designed and dimensioned to receive and retain an uncured (green) NPT tread layer 75, which may be constructed by any of various techniques that are well known in the art.

The first inner mold half 15 of the exemplary inner mold portion 10 is shown to include a base plate 15a, a bladder ring 15b located concentrically within and secured to the base plate, and a pair of wall segments 15c, 15d that are attached at one end to the base plate and extend substantially transversely therefrom. As described in more detail below and as further illustrated in FIG. 10, a hinged connection 20 may be used to couple the wall segments 15c, 15d of this inner mold portion embodiment to the base plate 15a. The hinged connection 20 allows the wall segments 15c, 15d to pivot inward from what may be an otherwise substantially perpendicular orientation to the base plate 15a when the inner mold halves 15, 30 are separated.

Figure 4:
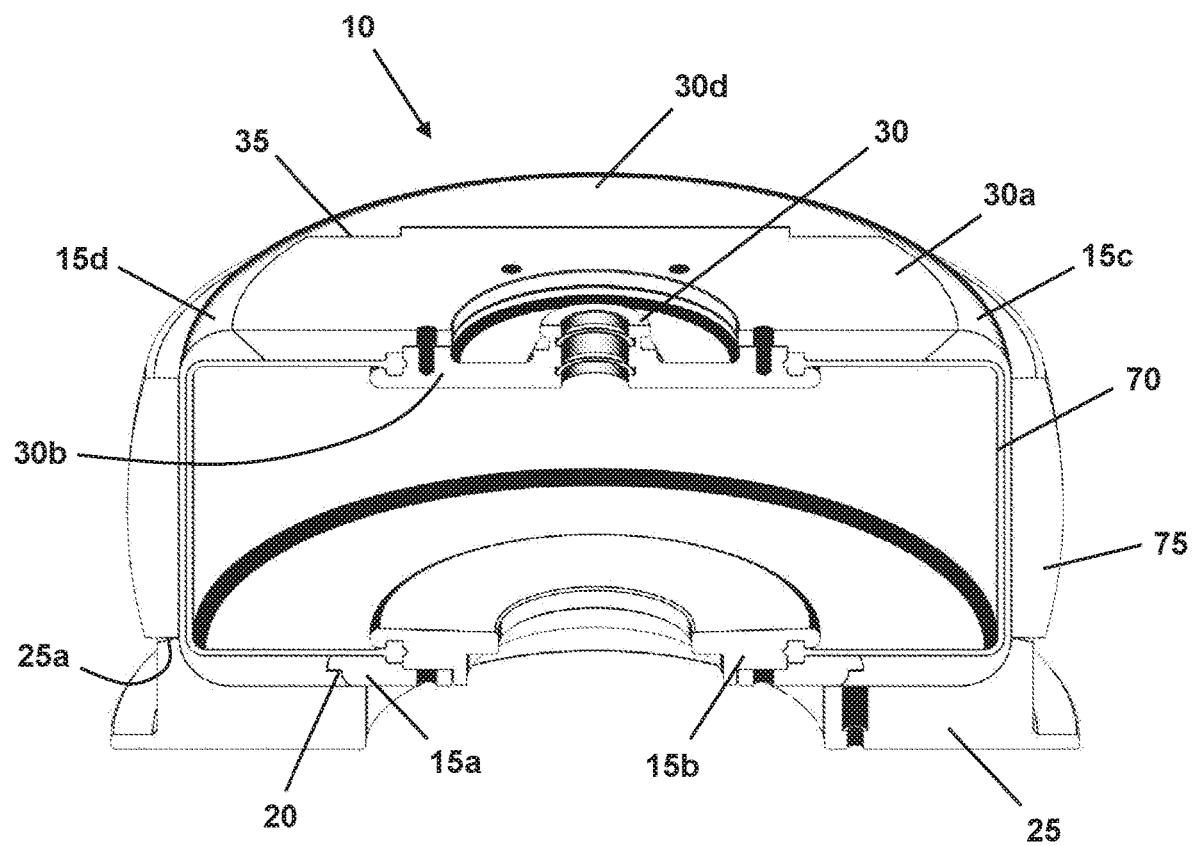
FIG. 4 is a cross-section of the inner mold portion and green NPT tread layer shown in FIG. 3.
Figure 6:
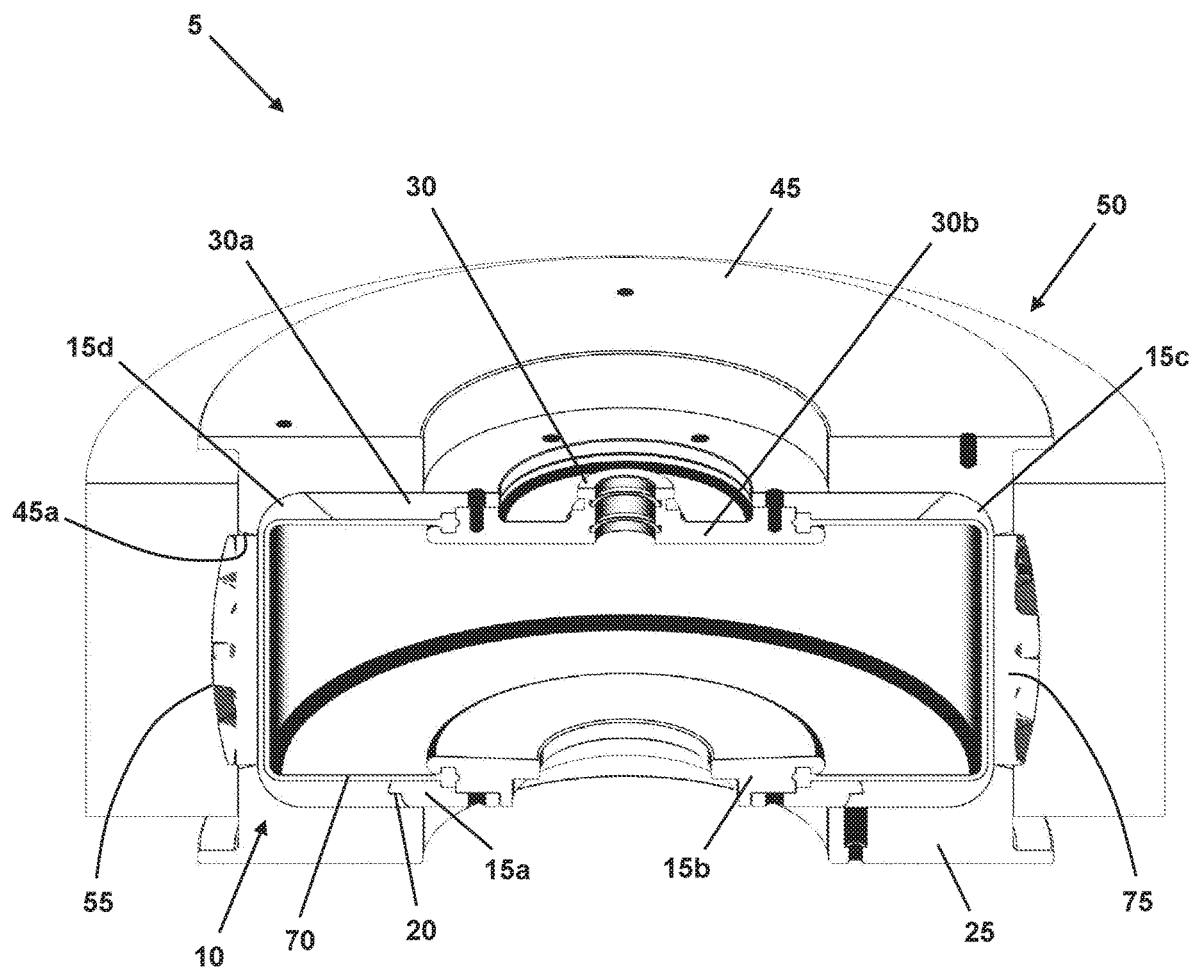
FIG. 6 is a cross-section of an assembled exemplary NPT tread layer mold, including a green NPT tread layer.

The first inner mold half 15 is associated with a first sidewall mold portion (e.g., plate) 25. As best shown in FIG. 4 and FIG. 6, the first sidewall plate 25 may be configured to releasably engage with the first inner mold half 15. As can be better understood from FIG. 9, the first sidewall plate 25 functions to form a limited first sidewall 65a that is present on a first side of a fully molded NPT tread layer 65. In this particular embodiment, the first sidewall plate 25 includes a tread pattern molding surface 25a that forms a tread pattern in the first sidewall 65a of the molded NPT tread layer 65. In other embodiments, the NPT tread layer sidewalls may be smooth and, consequently, the associated first tread plate 25 may be devoid of a tread pattern molding surface.

The second inner mold half 30 of the exemplary inner mold portion 10 may have a construction that is similar and complimentary to the first inner mold half 15. Particularly, the second inner mold half 30 also includes a base plate 30a, a bladder ring 30b located concentrically within and secured to the base plate, and a pair of wall segments 30c, 30d that are attached at one end to the base plate and extend substantially transversely therefrom. As with the wall segments 15c, 15d of the first inner mold portion 15, a hinged connection 35 may be used to couple the wall segments 30c, 30d of the second inner mold portion 30 to the base plate 30a, such that the wall segments 30c, 30d of the second inner mold portion 30 may also pivot inward from what may be an otherwise substantially perpendicular orientation to the base plate 30a when the inner mold halves 15, 30 are separated.

The second inner mold half 30 of the exemplary inner mold portion 10 may further include a mandrel 40 that facilitates gripping by an upper platen or other component of a molding press that is used to open and close (engage and separate) the first and second inner mold halves 15, 30 during a NPT tread layer molding operation.

The second inner mold half 30 is also associated with a second sidewall plate mold portion (e.g., plate) 45. As best shown in FIG. 6, the second sidewall plate 45 may be configured to releasably engage with the second inner mold half 30. As can be better understood from FIGS. 7-9, the second sidewall plate 45 functions to form a limited second sidewall 65b that is present on a second side of the fully molded NPT tread layer 65. The second sidewall plate 45 also includes a tread pattern molding surface 45a (FIG. 6) that forms a tread pattern in the second sidewall 65b of the molded NPT tread layer 65. In other embodiments, the NPT tread layer sidewalls may be smooth and, consequently, the associated second tread plate may be devoid of a tread pattern molding surface.

As shown in FIG. 4 and FIG. 6, when the first half 15 and second half 30 of the inner mold portion 10 are assembled, the associated wall segments 15c, 15d, 30c, 30d become engaged and cooperate to form a substantially solid NPT tread layer inner surface molding wall. The outer surface of the wall segments 15c, 15d, 30c, 30d may be coated or otherwise treated to facilitate separation of the NPT tread layer inner surface from the wall segments after molding of the NPT tread layer is complete. For example, and without limitation, the outer surface of the wall segments 15c, 15d, 30c, 30d may be coated with a non-stick substance such as a polytetrafluoroethylene (PTFE) material (e.g., Teflon™), or with another material offering similar non-stick or reduced-stick properties.

Figure 11A:
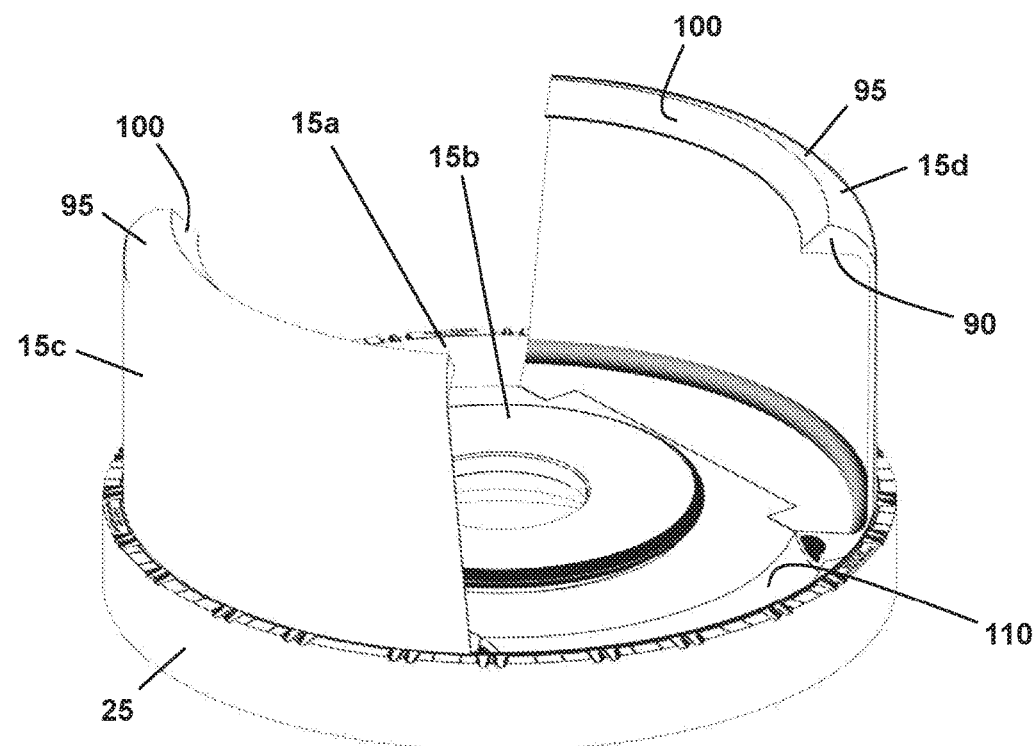
FIGS. 11A-11B further illustrate a wall segment design and engagement arrangement of one exemplary NPT tread layer mold.
Figure 11B:
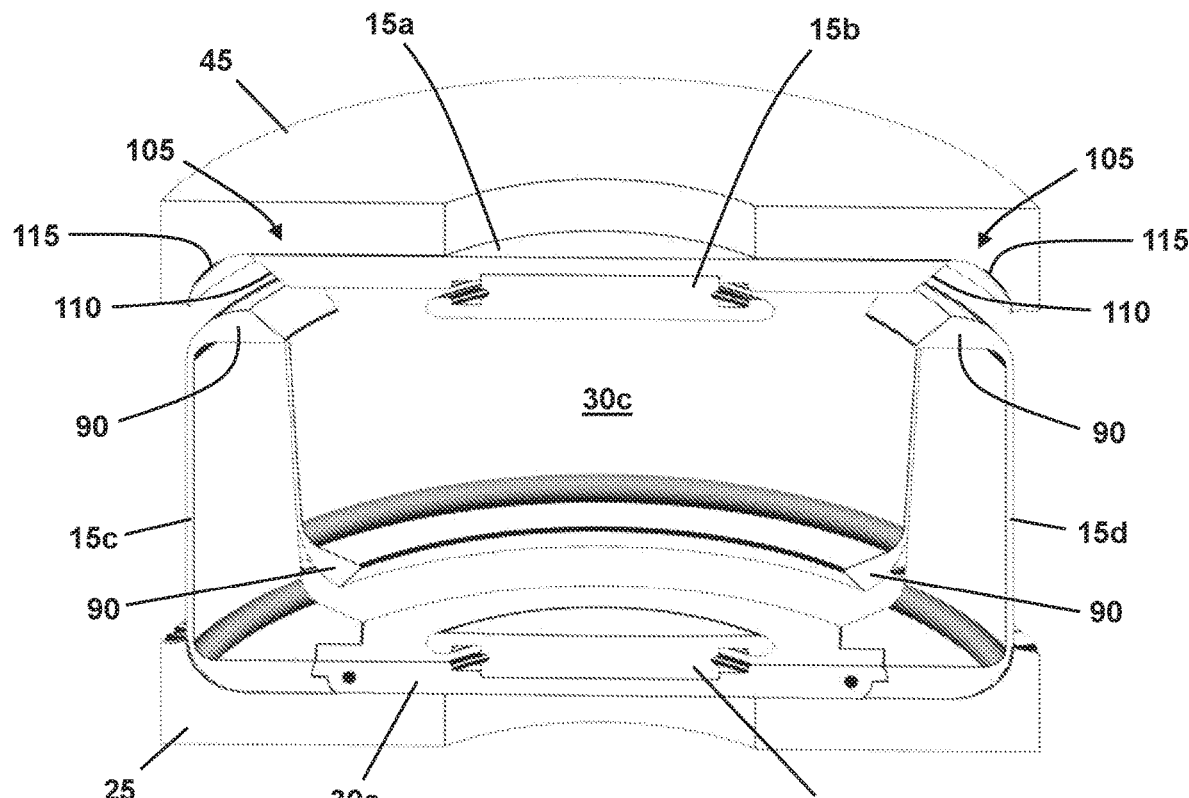

As best illustrated in FIG. 6 and FIGS. 11A-11B, each of the sidewall plates 25, 45 may include an inner mold portion wall segment engagement feature that contributes to locking the inner mold portion wall segments 15c, 15d, 30c, 30d in a position that is substantially perpendicular to the associated base plates 15a, 30a (or in some other position, if desired). Thus, when the inner mold portion 10 of this exemplary mold 5 is closed (i.e., the inner mold halves 15, 30 are fully engaged) and the sidewall plates 25, 45 are assembled thereto, the resulting NPT tread layer inner surface molding wall of this exemplary mold embodiment is substantially rigid and vertically oriented.

The NPT tread layer inner surface molding wall ensures that NPT tread layers can be repeatably and consistently molded with dimensionally accurate inner diameters. In some exemplary embodiments, the NPT tread layer inner surface molding wall resulting from engagement of the inner mold portion wall segments may be substantially flat and smooth so as to impart a substantially flat and smooth interior surface to the molded NPT tread layer. In other embodiments, the NPT tread layer inner surface molding wall may be concave, convex or of some shape other than flat, and/or may have a textured rather than smooth surface.

In any case, the NPT tread layer inner surface molding wall still controls the inner diameter of the molded NPT tread layer.

Figure 5:
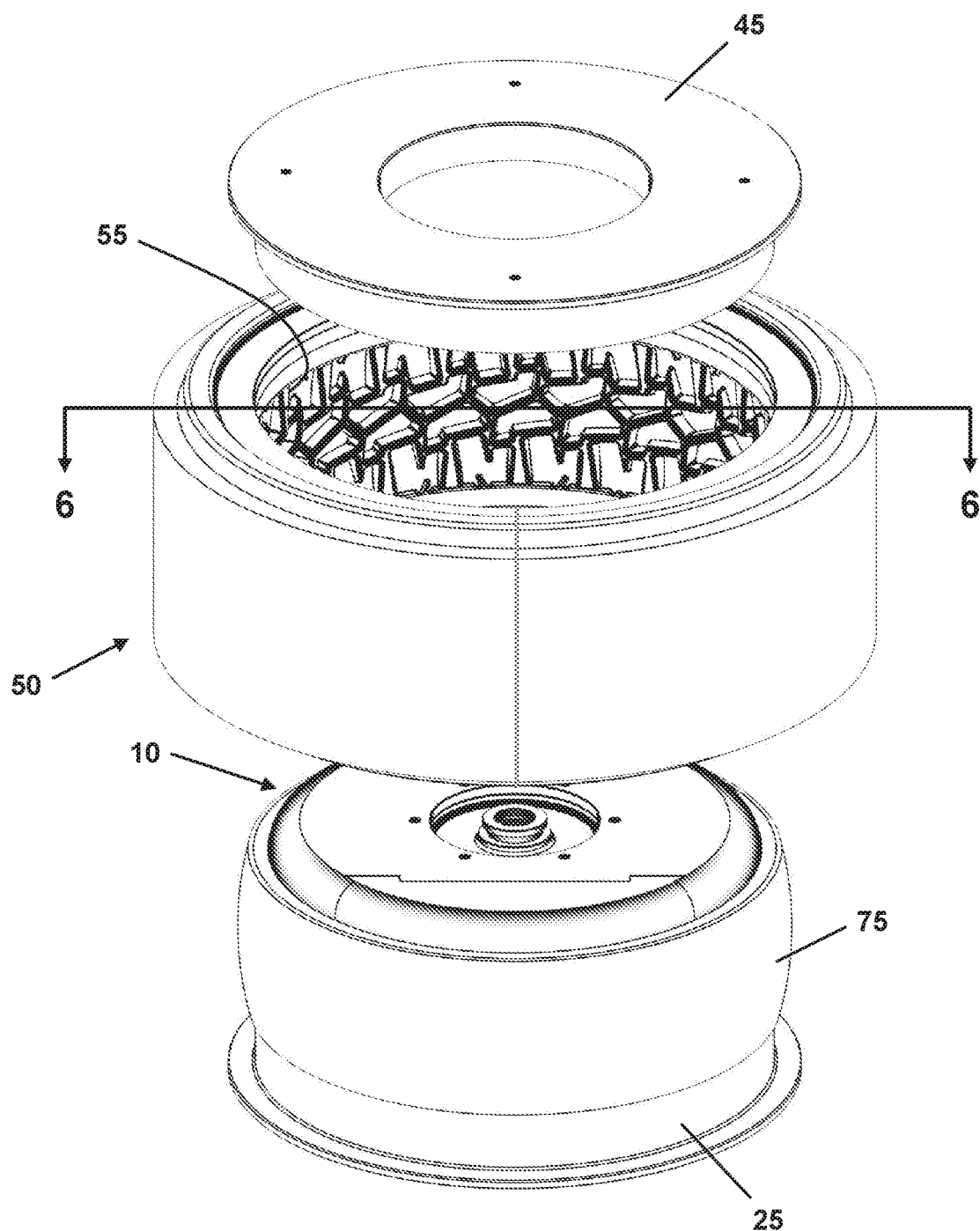
FIG. 5 represents an outer mold portion and a second sidewall plate of an exemplary NPT tread layer mold being assembled to the inner mold portion of FIG. 3.

As represented in FIG. 5 and FIG. 6, the exemplary NPT tread layer mold 5 also includes an outer mold portion 50 that cooperates with the inner mold portion 10 to mold and cure a NPT tread layer 65. Particularly, the outer mold portion 50 includes a cavity having a tread pattern molding surface 55 that is designed to impart a desired tread pattern 60 in the outer surface of the molded NPT tread layer 65. The face along each open side of the outer mold portion 50 may have one or more features that mate with cooperating features of the sidewall plates 25, 45. The outer mold portion 50 may also have other features that engage with corresponding features of the inner mold portion 10 to ensure proper mold alignment.

The outer mold portion 50 is substantially schematically depicted in the drawing figures for purposes of clarity. That is, while the outer mold portion 50 is represented as a substantially hollow but otherwise generally monolithic component in the drawing figures, it would be understood by one of skill in the art that an actual outer mold portion would typically be of segmented design so as to permit retraction of the outer mold portion from a molded NPT tread layer and the inner mold portion, and to allow for subsequent removal of the molded NPT tread layer from the inner mold portion.

Referring again to FIG. 4 and FIG. 6, it may be observed that the interior of the closed/assembled inner mold portion 10 is a substantially hollow chamber. An inflatable bladder 70 may be located within the inner mold portion 10. Open ends of the bladder 70 may be placed in sealing engagement with the bladder rings 15b, 30b. The bladder may be sufficiently stretchable when deflated to accommodate separation of the first and second inner mold halves 15, 30 while remaining in sealing engagement with the respective bladder rings 15b, 30b.

During the NPT tread layer molding and curing process, the bladder 70 may be inflated to apply pressure against the inner mold portion wall segments 15c, 15d, 30c, 30d which, in turn, apply pressure against the inner surface of the green NPT tread layer 75. The pressure applied to the inner mold portion wall segments 15c, 15d, 30c, 30d by the inflated bladder 70 forces the green NPT tread layer 65 against the tread pattern molding surface 55 of the outer mold portion 50, helping to ensure a complete molding of the tread pattern in the NPT tread layer outer surface. The design of the inner mold portion wall segments 15c, 15d, 30c, 30d and their engagement with the sidewall plates 25, 45, in conjunction with the pressure applied to the wall segments by the inflated bladder 70, also provides for a substantially rigid and vertically oriented NPT tread layer inner molding surface. As described above, such a NPT tread layer inner molding surface facilitates the molding of NPT tread layers having consistently accurate inner diameters.

An exemplary process for molding the exemplary NPT tread layer 50 is also illustrated in FIGS. 1-9. While only the several components of the exemplary NPT tread layer mold 5 are shown in FIGS. 1-9 for reasons of clarity, it should be realized that said components would be releasably coupled to various components of an automated tire molding machine, such as a tire molding press, during an actual NPT tread layer molding process.

As shown in FIG. 1, the first inner mold half 15 is initially associated with the first sidewall plate 25, which may be affixed, for example, to a lower portion (e.g., fixed platen) of a molding machine. The second inner mold half 30 is initially separated/disengaged from the first inner mold half 15. For example, the second inner mold half 30 may be initially maintained in a raised position above the first inner mold half 15 by an upper portion (e.g., movable platen) of a molding machine in a vertical molding operation.

In the separated condition shown, the wall segments 15c, 15d of the first inner mold half 15 and the wall segments 30c, 30d of the second inner mold half 30 are pivoted inward at the respective hinged connections 20, 35. As can best understood by reference to FIG. 2, the inwardly pivoted position of the first inner mold half wall segments 15c, 15d presents a partial NPT tread layer inner molding surface of reduced diameter, which facilitates installation of the green NPT tread layer 75 to the first inner mold half 15 as shown.

Figure 3:
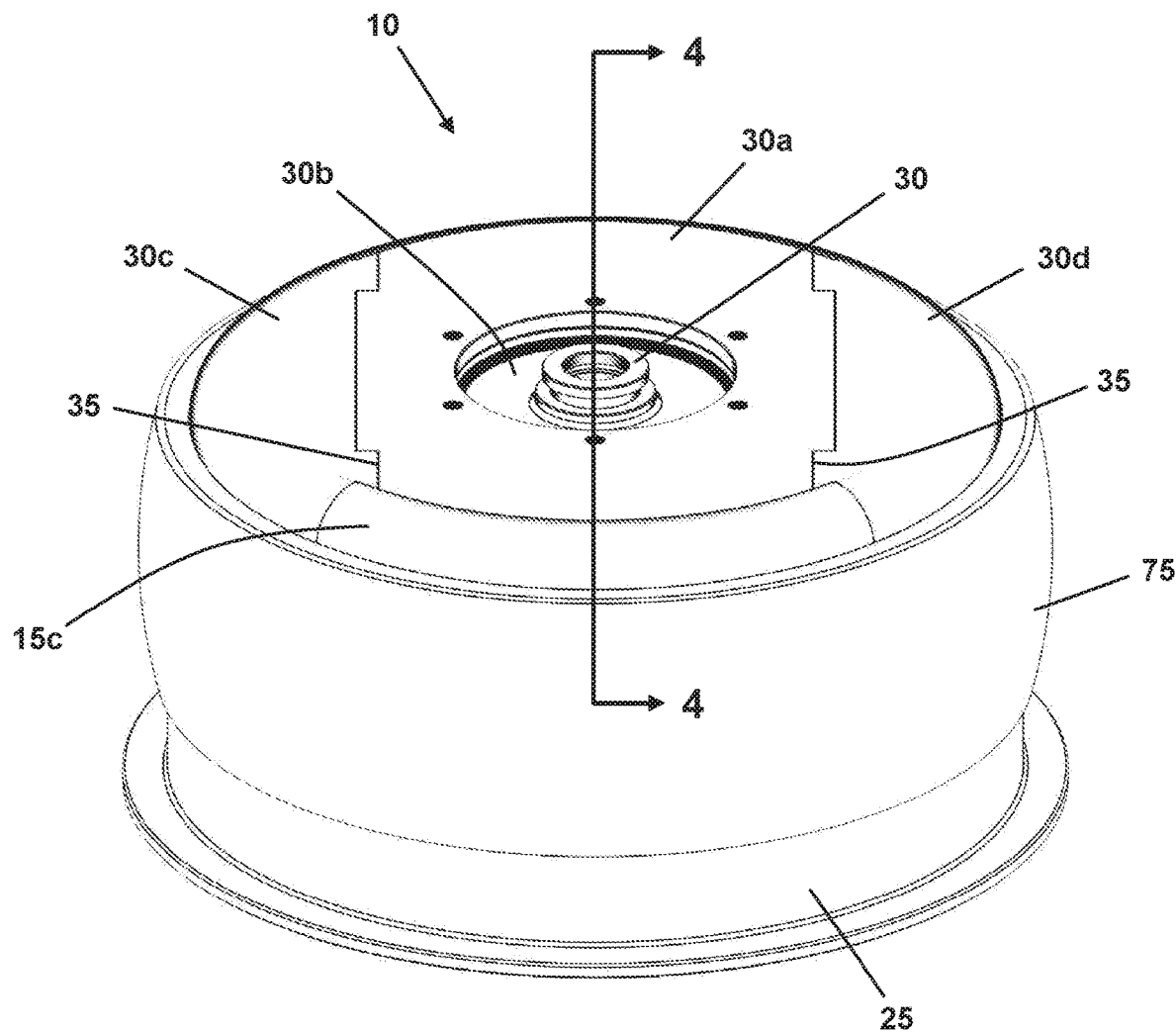
FIG. 3 shows the green NPT layer surrounding an outer periphery of the assembled inner mold portion, which is comprised of the engaged inner mold halves of FIGS. 1-2.

Likewise, the inwardly pivoted position of the second inner mold half wall segments 30c, 30d presents a partial NPT tread layer inner molding surface of reduced diameter, which facilitates passage of the wall segments 30c, 30d through the green NPT tread layer 75 during closing of the inner mold 10 and engagement of the first and second inner mold halves 15, 30. As explained above and illustrated in FIG. 4 and FIG. 6, once the inner mold 10 is closed, the wall segments 15c, 15d, 30c, 30d of the first and second inner mold halves 15, 30 are pivoted outward—and preferably locked—in a substantially perpendicular orientation with their respective base plates 15a, 30a to form a NPT tread layer inner surface molding wall. The closed inner mold 10 with the green NPT tread layer 75 properly positioned thereon is depicted in FIG. 3.

With the green NPT tread layer 75 properly positioned on the closed inner mold portion 10, the outer mold portion 50 is then moved into position to surround the green NPT tread layer as represented in FIGS. 5-6, and the second sidewall plate 45 is assembled thereto. The fully assembled NPT tread layer mold 5 is shown in cross section in FIG. 6. As previously mentioned, an actual exemplary outer mold portion 50 will typically be segmented to facilitate proper positioning with respect to the inner mold portion 10 and retained green NPT tread layer 75 prior to molding, as well as retraction from the molded NPT tread layer 75 after molding.

With the NPT tread layer mold 5 fully assembled, the bladder 70 may be inflated to apply pressure against the inner mold portion wall segments 15c, 15d, 30c, 30d (tread layer inner surface molding wall), as described above. As would be familiar to one of skill in the art, molding of the tread pattern 65 and curing of the green NPT tread layer 75 may further occur using heat, such as but not limited to, inflating the bladder 70 with steam. A cooperating shaft assembly (not shown) may be provided to supply steam to the bladder 70 according to one exemplary molding method.

Figure 7:
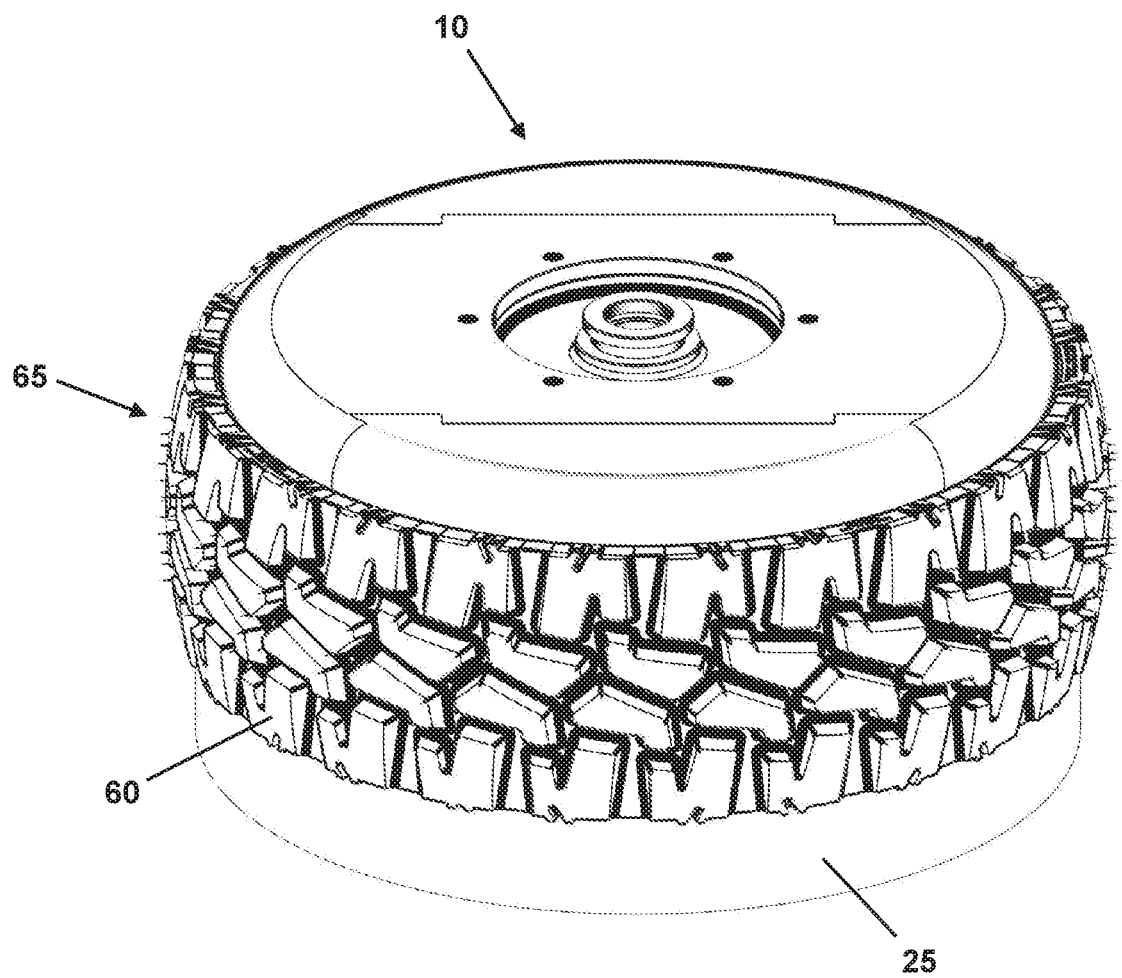
FIG. 7 depicts a molded NPT tread layer after the outer mold portion and second sidewall plate have been removed from the assembled mold of FIG. 6.

Once the NPT tread layer molding process is complete, the outer mold portion 50 and the second sidewall plate 45 may be withdrawn from the inner mold portion 10, as represented in FIG. 7. As shown, the molded NPT tread layer 65 may remain on the closed inner mold portion 10 at this point.

Figure 8:
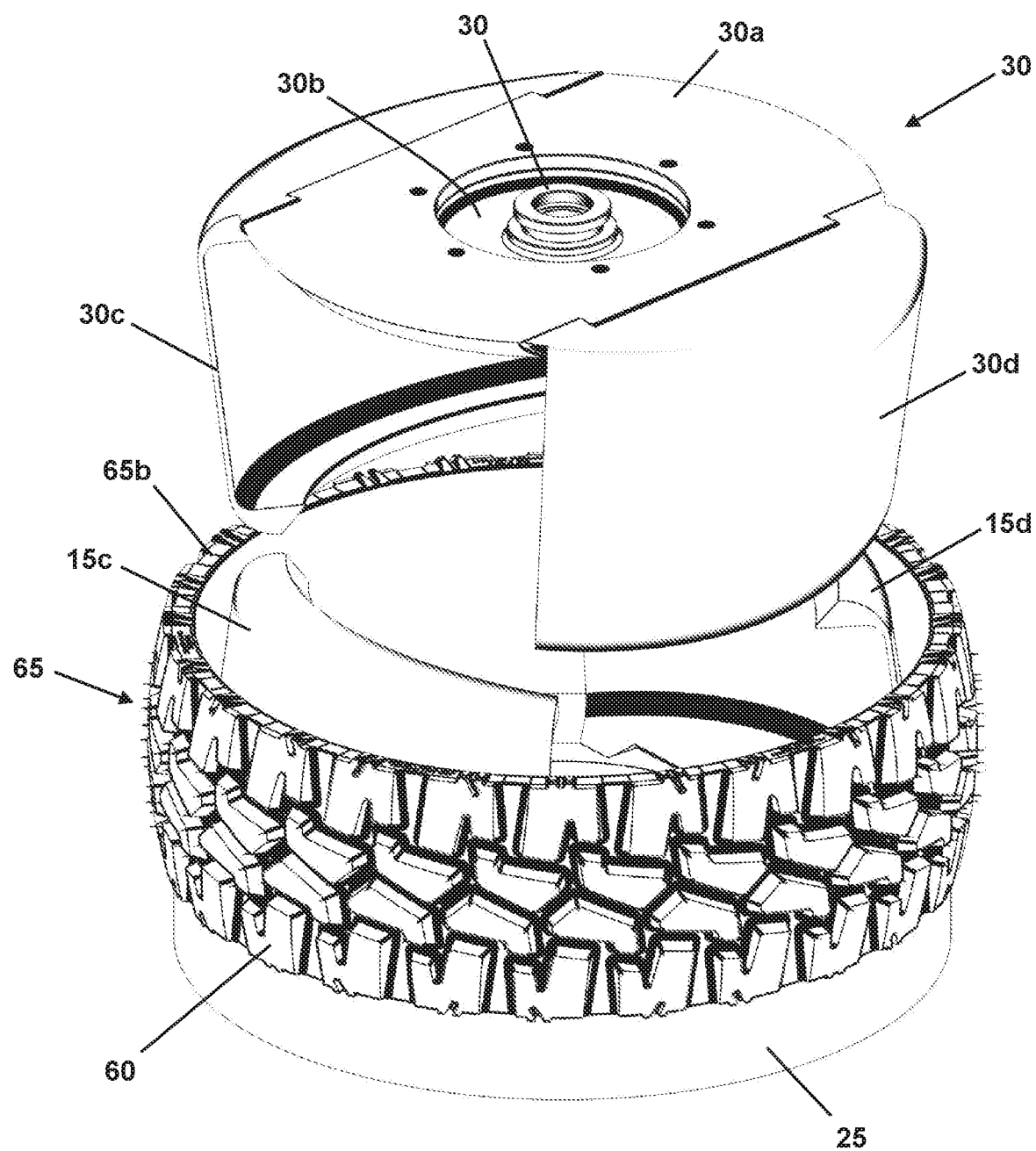
FIG. 8 illustrates separation of one half of the inner mold portion from the other, prior to release of the molded NPT tread layer.
Figure 9:
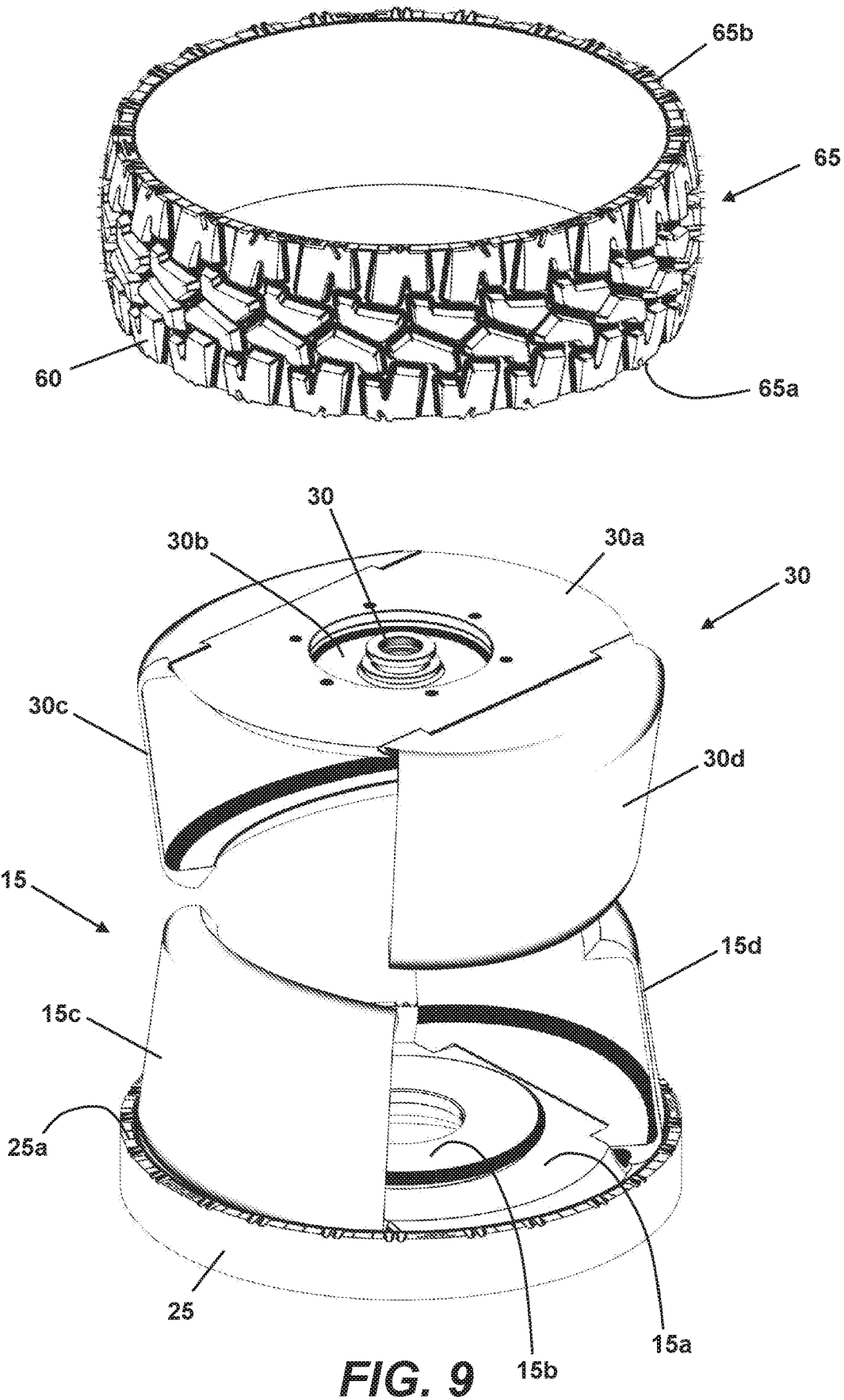
FIG. 9 shows the molded NPT tread layer after removal from the separated mold halves of the inner mold portion.

With the outer mold portion 50 removed, the second inner mold half 30 may be withdrawn from the first inner mold half 15, as shown in FIG. 8. Withdrawal of the second inner mold half 30 results in an inward pivoting of each of the inner mold portion wall segments 15c, 15d, 30c, 30d, which provides for clearance between the outer surface of the wall segments and the inner surface of the molded NPT tread layer 65. As illustrated in FIG. 9, the molded NPT tread layer 65 may then be removed from the first inner mold half 15.

Certain possible features of exemplary NPT tread layer molds are illustrated, or further illustrated, in FIGS. 10-12B.

Figure 10:
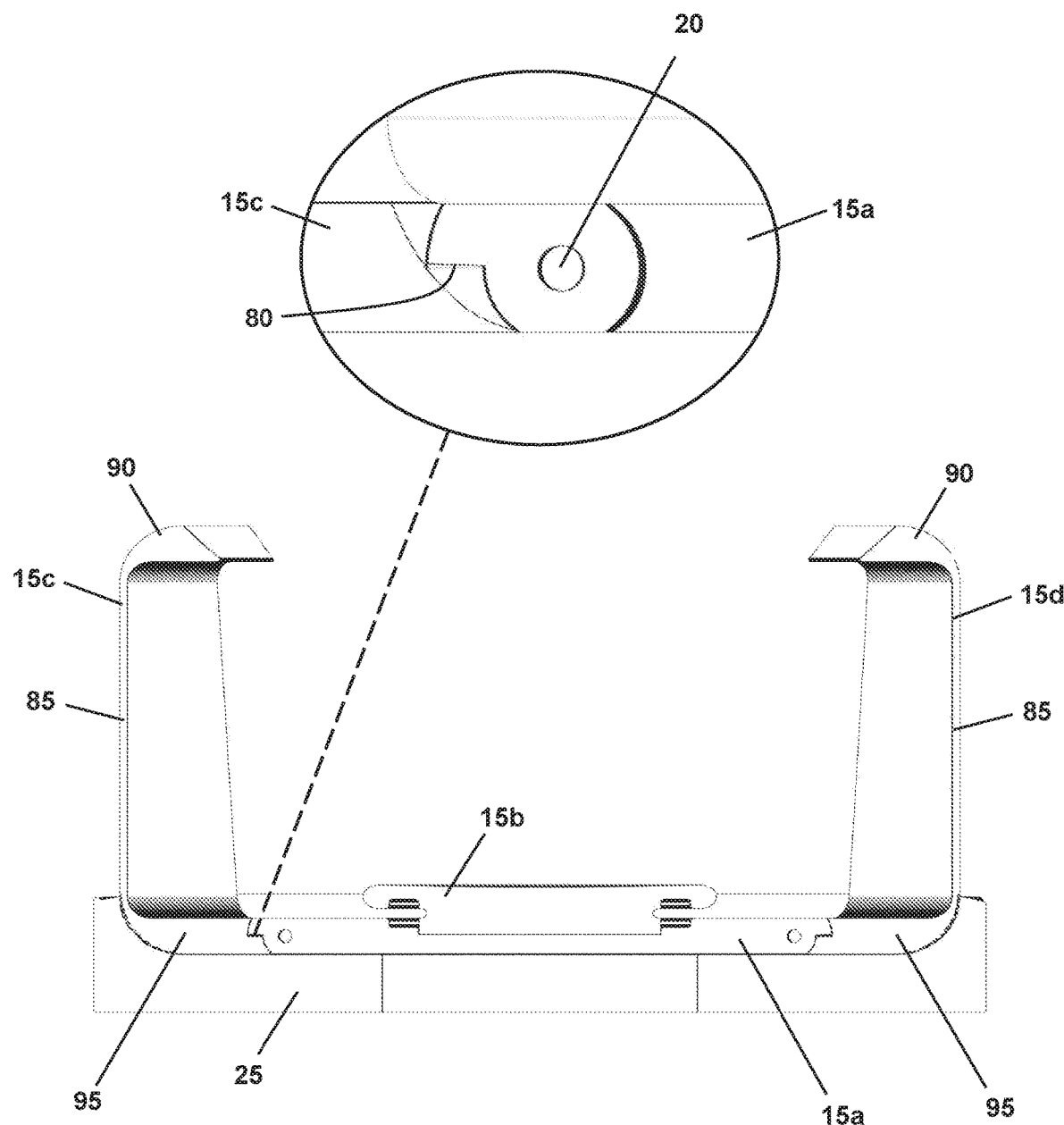
FIG. 10 further illustrates a wall segment hinged connection feature of one exemplary NPT tread layer mold.

FIG. 10 is provided to better illustrate the previously described hinged connection between the wall segments 15c, 15d, 30c, 30d of the first and second inner mold halves 15, 30. While the detailed view of FIG. 10 is shown only with respect to the wall segment 15c of the first inner mold half 15 for purposes of clarity and brevity, the hinge connection details of FIG. 10 apply equally well to the wall segment 15d of the first inner mold half 15, as well as the wall segments 30c, 30d of the second inner mold half 30.

As shown in FIG. 10, the engaging portions of the base plate 15a and the wall segment 15c of this exemplary embodiment are designed to limit the overall angle 80 through which the wall segment 15c may pivot relative to the base plate 15a. In this embodiment, the limiting angle 80 is produced by a hard stop created by one or both of the engaging sections of the wall segment 15c and the base plate 15a. Other techniques for limiting the wall segment pivot angle may be employed in other embodiments.

Another possible feature of an exemplary NPT tread layer mold is also observable by reference to FIG. 10. Particularly, FIG. 10 illustrates in better detail that the wall segments 15c, 15d of the first inner mold half 15 may be provided with a non-uniform wall thickness. As shown, for example, the wall segments 15c, 15d may have a thin central section 85 that extends between thicker end portions 90, 95. The central portion 85 will be in contact with the inner surface of the NPT tread layer during molding and, therefore, thinning the inner mold portion wall segments in this area allows for better heat transfer between the inflatable bladder 70 and the NPT tread layer. Thicker end sections 90, 95, on the other hand, provide for increased strength along the areas of the inner mold portion wall segments that are either hingedly connected to the base plate 15a or engaged with the base plate 30 and the second sidewall segment of the second inner mold half 30. As also shown, the inner surface of the wall segments 15c, 15d may provide a smoothly curving transition between the central section 85 and the end portions 90, 95 to better cooperate with the general shape of a typical inflatable bladder 70. It should again be noted that while FIG. 10 depicts only the wall segments 15c, 15d of the first inner mold half 15 for purposes of clarity and brevity, the aforementioned wall segment design details apply equally well to the wall segments 30c, 30d of the second inner mold half 30.

Referring now primarily to FIGS. 11A-11B, another possible feature of an exemplary NPT tread layer mold, such as the exemplary mold 5, is illustrated in further detail. As shown in FIGS. 11A-11B and as discussed briefly previously, the wall segments 15c, 15d, of the first inner mold half 15 may be designed to interlock with the base plate 30a and the second sidewall plate 45 of the second inner mold half, and the wall segments 30c, 30d, of the second inner mold half 30 may be designed to interlock with the base plate 15a and the first sidewall plate 25 of the first inner mold half 15.

Interlocking of the wall segments in this exemplary embodiment of the NPT tread layer mold 5 is accomplished through cooperating wall segment end portion and base plate/sidewall plate shapes. More particularly, it may be observed in FIGS. 11A-11B that the free end 90 of each wall segment 15c, 15d, 30c (and 30d not shown) has a generally peaked shape with a curved outer surface 95 and an inwardly sloping inner surface 100. A complimentary-shaped receiving cavity 105 is formed by the combination of an angled outer periphery 110 of the base plates 15a, 30a and a curved adjacent surface 115 of the associated sidewall plates 25, 45. Thus, when the first inner mold portion 15 is fully engaged with the second inner mold portion 30, and both sidewall plates 25, 45 are installed to the mold 5, the free end portions 90 of the inner mold wall segments 15c, 15d, 30c, 30d are received in the cavities 105, which ensures that the wall segments are rotated to a desired (e.g., substantially vertical) orientation and that the wall segments are locked against any movement during molding.

Figure 12A:
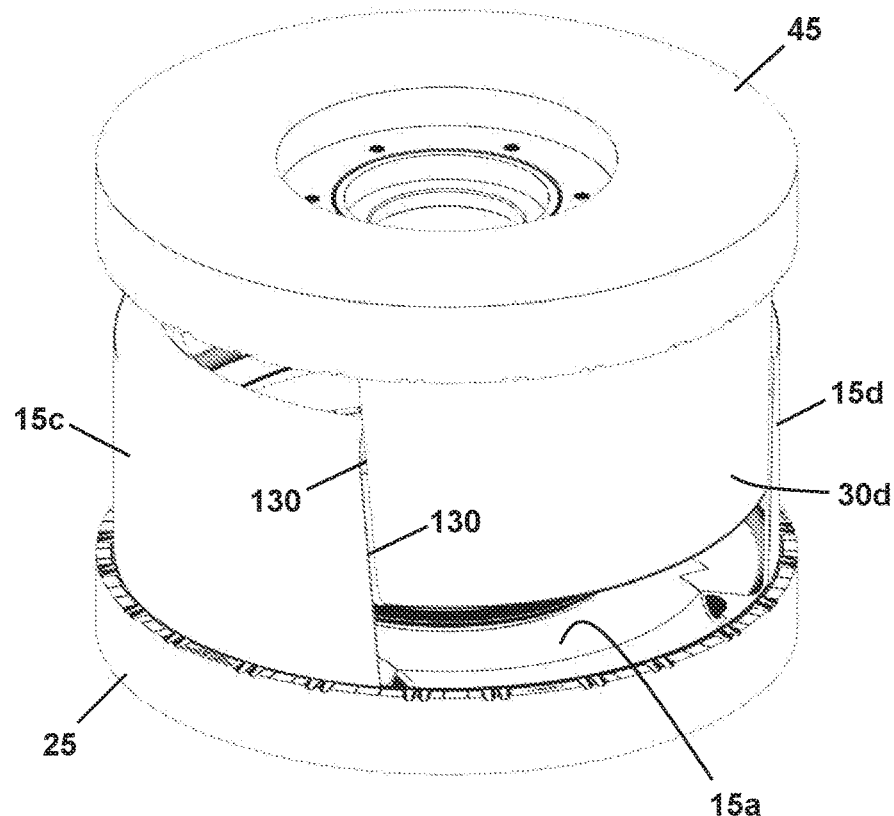
FIGS. 12A-12B further illustrate an interdigitating and angled wall segment design of one exemplary NPT tread layer mold.
Figure 12B:
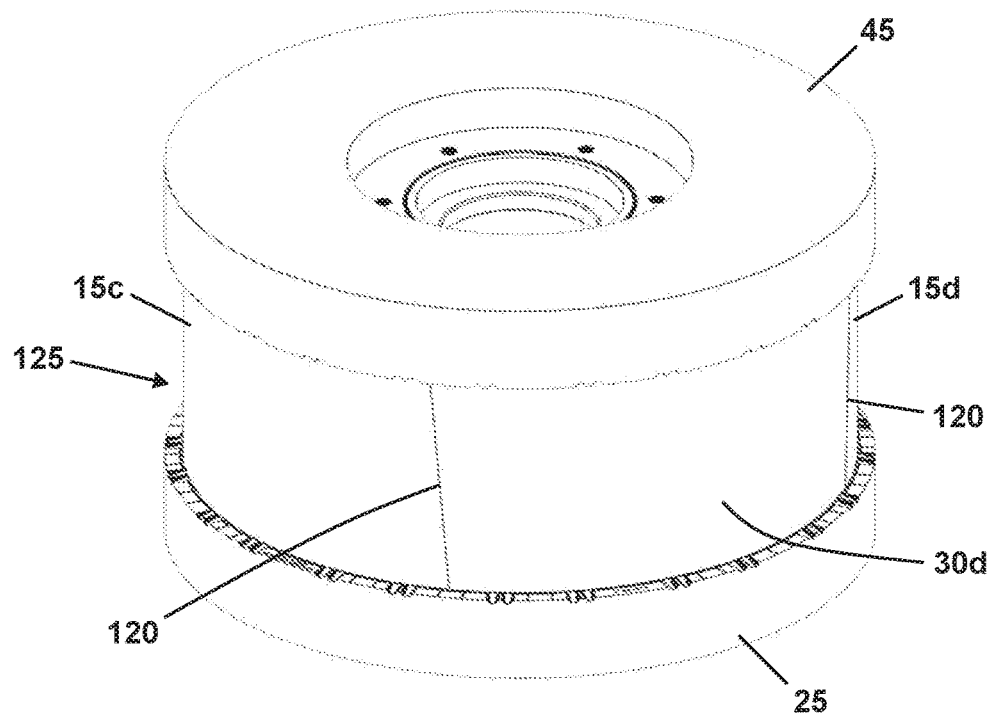

FIGS. 12A-12B further illustrates a possible design and interaction of the wall segments of an exemplary inner mold portion of an exemplary NPT tread layer mold. For purposes of illustration and simplicity, the inner mold portion wall segment design is shown in FIGS. 12A-12B to be employed in the exemplary NPT tread layer mold 5 already shown and described herein. In both FIG. 12A and FIG. 12B, the assembled NPT tread layer mold 5 is depicted without the outer mold portion 50 for better clarity.

FIG. 12A shows an assembly of the second inner mold half and the second sidewall plate 45 just prior to full engagement with an assembly of the first inner mold half 15 and the first sidewall plate 25. In this position, there has not yet been contact between the inner mold portion wall segments 15c, 15d, 30c, 30d. FIG. 12B shows the inner mold portion 10 in a fully closed condition, where the inner mold portion wall segments 15c, 15d, 30c, 30d have entered into interdigitating engagement with preferably tight seams 120 therebetween so as to form a substantially solid NPT tread layer inner surface molding wall 125.

In order to facilitate engagement of the inner mold portion wall segments 15c, 15d, 30c, 30d during closing of the inner mold portion 10, and to minimize interference between the wall segments during inner mold portion opening and closing, the peripheral edges 130 of each wall segment may be angled as shown in FIG. 12A. For example, the peripheral edges of the wall segments 15c, 15d, 30c, 30d of the exemplary inner mold portion 10 have an angle of approximately five degrees relative to a diametral plane passing through the mold 5. Other wall segment angles may be employed in other embodiments.

It should be obvious to one of skill in the art that variations and modifications of the exemplary embodiments described herein are possible without departing from the scope of the general inventive concept. For example, and without limitation, an inner mold portion in other mold embodiments may have a number of wall segments other than four, molding of a NPT tread layer may occur without the use of a bladder, the interlocking features associated with the inner mold wall segments may be omitted or altered in design, etc. Thus, while certain exemplary embodiments are described in detail above, the scope of the general inventive concept is not considered limited by such disclosure, and modifications are possible without departing from the spirit of the general inventive concept as evidenced by the following claims:

What is claimed is:

1. A non-pneumatic tire tread layer mold, comprising:
an inner mold portion having a first mold half and an opposed second mold half, the mold halves designed for separable engagement;
a plurality of wall segments associated with each of the first mold half and the second mold half, the wall segments of one mold half arranged and configured so as to extend toward the other mold half when the mold halves are arranged for molding;
a tread layer inner surface molding wall formed by the plurality of wall segments when the inner mold portion is closed and the mold halves are engaged; and an outer mold portion configured to surround a portion of the inner mold portion and including a tread pattern molding section.

2. The mold of claim 1, further comprising sidewall mold portions configured to support an uncured tread layer and to form tread layer side walls during molding.

3. The mold of claim 1, wherein each of the first mold half and the second mold half further includes:
a base plate; and
a bladder ring affixed to the base plate.

4. The mold of claim 3, wherein one end of the wall segments of the first mold half are hingedly connected to the base plate of the first mold half, and one end of the wall segments of the second mold half are hingedly connected to the base plate of the second mold half, such that each of the wall segments is inwardly pivotable toward a center of the mold.

5. The mold of claim 4, wherein the angle of pivot of the wall segments is limited.

6. The mold of claim 3, further comprising an inflatable bladder that is inflatable within the inner mold portion when the inner mold portion is closed, the bladder configured to exert pressure against the tread layer inner surface molding wall upon inflation.

7. The mold of claim 1, wherein the wall segments forming the inner mold portion are locked in position when the mold is fully assembled.

8. The mold of claim 1, wherein peripheral edges of each inner mold portion wall segment are angled relative to a diametral plane passing through the mold.

9. The mold of claim 1, wherein the inner mold portion wall segments are engaged in an interdigitating manner when the inner mold portion is in a closed state.

10. The mold of claim 1, wherein the tread layer inner surface molding wall formed by the inner mold portion wall segments is substantially perpendicular to the mold centerline.

11. A non-pneumatic tire tread layer mold, comprising:
an inner mold portion having a first mold half and an opposed second mold half, the mold halves designed for separable engagement;
a plurality of wall segments associated with and extending from each of the first mold half and the second mold half, the wall segments of one mold half arranged and configured so as to extend toward the other mold half when the mold halves are placed in a molding machine and to engage in an interdigitating manner and to form a tread layer inner surface molding wall when the inner mold portion is closed;
a first sidewall mold portion associated with the first mold half and a second sidewall mold portion associated with the second mold half, the sidewall mold portions configured to support an uncured tread layer and to form tread layer side walls during molding; and
an outer mold portion configured to surround a portion of the inner mold portion, the outer mold portion including a tread pattern molding section for imparting a tread pattern to a molded tread layer.

12. The mold of claim 11, wherein each of the first mold half and the second mold half further includes:
a base plate; and
a bladder ring affixed to the base plate.

13. The mold of claim 12, wherein one end of each wall segment and the base plate of the first mold half are hingedly connected, and one end of each wall segment and the base plate of the second mold half are hingedly connected, such that each of the wall segments is inwardly pivotable through a limited angle toward a center of the mold.

14. The mold of claim 11, further comprising an inflatable bladder that is inflatable within the inner mold portion and configured to exert pressure against the tread layer inner surface molding wall when inflated.

15. The mold of claim 12, wherein the inner mold portion wall segments are locked in position by respective releasable engagement with the first and second sidewall mold portions and the base plates when the mold is fully assembled.

16. The mold of claim 11, wherein peripheral edges of each inner mold portion wall segment are angled relative to a diametral plane passing through the mold.

17. A non-pneumatic tire tread layer mold, comprising:
an inner mold portion having a first mold half and an opposed second mold half;
the first inner mold portion mold half including a base plate, a bladder ring, and a plurality of wall segments that are coupled to the base plate at one end by a hinged connection and extend substantially transversely from the base plate toward the second mold half when the mold halves are associated with respective portions of a molding machine;
the second inner mold portion mold half including a base plate, a bladder ring, and a plurality of wall segments that are coupled to the base plate at one end by a hinged connection and extend substantially transversely from the base plate toward the first mold half when the mold halves are associated with respective portions of the molding machine;
a tread layer inner surface molding wall formed by interdigitating engagement of the inner mold portion wall segments when the inner mold portion is closed;
a first sidewall plate associated with the first inner mold portion mold half and a second sidewall plate associated with the second inner mold portion mold half, the sidewall plates arranged and configured to support an uncured tread layer and to form sidewalls in the tread layer during molding;
an outer mold portion configured to surround a portion of the inner mold portion at the approximate location of the tread layer inner surface molding wall, the outer mold portion having a cavity containing a tread pattern molding section and configured to create a tread pattern in an outer surface of the tread layer; and
an inflatable bladder within the inner mold portion, the bladder adapted, when the inner mold portion is closed, to exert pressure against the inner mold portion wall segments upon inflation.

18. The mold of claim 17, wherein the inner mold portion wall segments are inwardly pivotable through a limited angle toward a center of the mold.

19. The mold of claim 17, wherein the inner mold portion wall segments are locked in position by releasable engagement with the first and second sidewall plates and the base plates when the mold is fully assembled.

20. The mold of claim 17, wherein peripheral edges of each inner mold portion wall segment are angled relative to a diametral plane passing through the mold.

* * * * *